United States Patent
Nakamura

(10) Patent No.: US 10,970,606 B2
(45) Date of Patent: Apr. 6, 2021

(54) CONNECTOR HAVING COVER, BASE AND METAL MEMBER WITH A LOCKING PORTION, A COUPLING PORTION WITH A STANDING PORTION, AND A REINFORCING PORTION OVERLAPPING AN AREA OF TWICE A PREDETERMINED DISTANCE FROM THE STANDING PORTION

(71) Applicant: Japan Aviation Electronics Industry, Limited, Tokyo (JP)

(72) Inventor: Tomohiro Nakamura, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 16/929,251

(22) Filed: Jul. 15, 2020

(65) Prior Publication Data

US 2021/0064944 A1    Mar. 4, 2021

(30) Foreign Application Priority Data

Sep. 2, 2019  (JP) .............................. JP2019-159250

(51) Int. Cl.
*H01R 13/50* (2006.01)
*G06K 13/08* (2006.01)
(Continued)

(52) U.S. Cl.
CPC ....... *G06K 13/0862* (2013.01); *H01R 13/447* (2013.01); *H01R 13/501* (2013.01);
(Continued)

(58) Field of Classification Search
CPC .. G06K 13/0862; H01R 12/89; H01R 13/501; H01R 13/24; H01R 12/88
See application file for complete search history.

(56) References Cited

U.S. PATENT DOCUMENTS 5,813,878 A * 9/1998 Kuwata .............. G06K 13/0862
439/326
6,869,302 B2 * 3/2005 Bricaud ............... G06K 7/0021
439/326
(Continued)

FOREIGN PATENT DOCUMENTS

| JP | 2003-331975 A | 11/2003 |
| JP | 2004-111125 A | 4/2004 |
| JP | 2011-113712 A | 6/2011 |

*Primary Examiner* — Tho D Ta
(74) *Attorney, Agent, or Firm* — Collard & Roe, P.C.

(57) ABSTRACT

A connector comprises a cover, a base, a hinge mechanism, a terminal and a metal member. The cover is provided with a locked portion. The metal member is held by the base. The metal member has a locking portion, a coupling portion and a reinforcing portion. The locking portion has a first regulating portion and a second regulating portion. The coupling portion integrally couples the first regulating portion and the reinforcing portion with each other. The coupling portion and the second regulating portion are positioned away from each other by a predetermined distance in a front-rear direction. The coupling portion has a standing portion. The reinforcing portion is soldered on a circuit board when the connector is mounted on the circuit board. In a plane perpendicular to an up-down direction, the reinforcing portion at least overlaps with an area within a range of twice the predetermined distance from the standing portion.

5 Claims, 11 Drawing Sheets

(51) Int. Cl.
*H01R 13/629* (2006.01)
*H01R 13/447* (2006.01)
*H01R 13/502* (2006.01)
*H01R 13/24* (2006.01)
*H01R 12/89* (2011.01)
*H01R 12/88* (2011.01)

(52) U.S. Cl.
CPC ......... *H01R 13/502* (2013.01); *H01R 13/629* (2013.01); *H01R 12/88* (2013.01); *H01R 12/89* (2013.01); *H01R 13/24* (2013.01)

(56) References Cited

U.S. PATENT DOCUMENTS

| | | | |
|---|---|---|---|
| 7,063,552 B2 | 6/2006 | Matsunaga et al. | |
| 7,435,119 B2 * | 10/2008 | Chang | G06K 7/0069 439/188 |
| 7,866,988 B2 * | 1/2011 | Shimada | H01R 12/88 439/76.1 |

* cited by examiner

CONNECTOR HAVING COVER, BASE AND METAL MEMBER WITH A LOCKING PORTION, A COUPLING PORTION WITH A STANDING PORTION, AND A REINFORCING PORTION OVERLAPPING AN AREA OF TWICE A PREDETERMINED DISTANCE FROM THE STANDING PORTION

CROSS REFERENCE TO RELATED APPLICATIONS

This application is based on and claims priority under 35 U.S.C. § 119 to Japanese Patent Application No. JP2019-159250 filed Sep. 2, 2019, the contents of which are incorporated herein in their entirety by reference.

BACKGROUND OF THE INVENTION

This invention relates to a connector comprising a cover.

As shown in FIGS. 19 to 21, JPA2004-111125 (Patent Document 1) discloses a connector 900 of this type. The connector 900 comprises a cover 910, a base 920, hinge mechanisms 930, terminals 950 and metal members 960. The cover 910 is attached to the base 920 by the hinge mechanisms 930. Each of the hinge mechanisms 930 is closer to a positive X-end 924 of the base 920 than to a negative X-end 922 of the base 920 in an X-direction. The cover 910 is provided with locked portions 912. The metal members 960 are held by the base 920. Each of the metal members 960 has a locking portion 970 and a soldered portion 980. The locking portion 970 has a first regulating portion 972 and a second regulating portion 974. The second regulating portion 974 extends in a negative Z-direction from a positive X-end 9722 of the first regulating portion 972.

If the connector 900 of Patent Document 1 is modified to have an increased number of the terminals 950, springs of the terminals 950 are expected to provide an increased reaction force. If the cover 910 is closed in a state where the card 990 is accommodated in the modified connector 900 having the increased number of the terminals 950, the increased reaction force causes the locked portions 912 of the cover 910 to apply forces in a positive Z-direction to the first regulating portions 972 of the locking portions 970. Thus, the base 920, which supports the metal members 960, might be damaged or deformed in the modified connector 900.

SUMMARY OF THE INVENTION

It is therefore an object of the present invention to provide a connector which prevents a base from being damaged and deformed if the connector has an increased number of terminals.

One aspect of the present invention provides a connector mountable on a circuit board. The connector comprises a cover, a base, a hinge mechanism, a terminal and a metal member. The cover is attached to the base by the hinge mechanism. The base has a front end and a rear end in a front-rear direction. The hinge mechanism is closer to the front end of the base than to the rear end of the base in the front-rear direction. The cover is provided with a locked portion. The metal member is held by the base. The metal member has a locking portion, a coupling portion and a reinforcing portion. The locking portion has a first regulating portion and a second regulating portion. The first regulating portion has a front end in the front-rear direction. The second regulating portion extends downward in an up-down direction perpendicular to the front-rear direction from the front end of the first regulating portion. The coupling portion integrally couples the first regulating portion and the reinforcing portion with each other. The coupling portion and the second regulating portion are positioned away from each other by a predetermined distance in the front-rear direction. The coupling portion has a standing portion. The standing portion extends at least downward in the up-down direction from the first regulating portion. The reinforcing portion is soldered on the circuit board when the connector is mounted on the circuit board. In a plane perpendicular to the up-down direction, the reinforcing portion at least overlaps with an area within a range of twice the predetermined distance from the standing portion.

The connector of the present invention is configured as follows: the metal member has the locking portion, the coupling portion and the reinforcing portion, wherein the locking portion has the first regulating portion and the reinforcing portion is soldered on the circuit board when the connector is mounted on the circuit board; the coupling portion integrally couples the first regulating portion and the reinforcing portion with each other; the coupling portion has the standing portion which extends at least downward in the up-down direction perpendicular to the front-rear direction from the first regulating portion; and, in the plane perpendicular to the up-down direction, the reinforcing portion at least overlaps with the area within the range of twice the predetermined distance from the standing portion. Specifically, when the connector is mounted on the circuit board, the reinforcing portion is soldered on the circuit board at a place which is positioned just below the locking portion or in the vicinity below the locking portion. When the cover is closed in a state where a connecting object is accommodated in the connector of the present invention, a reaction force of springs of the terminals presses the locked portion of the cover against the first regulating portion of the locking portion so that a force is applied to the first regulating portion. Because of the soldering of the reinforcing portion on the circuit board at the place, the force applied to the first regulating portion is securely received by the circuit board via the coupling portion and the reinforcing portion. Thus, the base, which supports the metal member, can be prevented from being damaged and deformed. In other words, the connector of the present invention prevents the base from being damaged and deformed if the connector has an increased number of the terminals.

An appreciation of the objectives of the present invention and a more complete understanding of its structure may be had by studying the following description of the preferred embodiment and by referring to the accompanying drawings.

Figure 1:
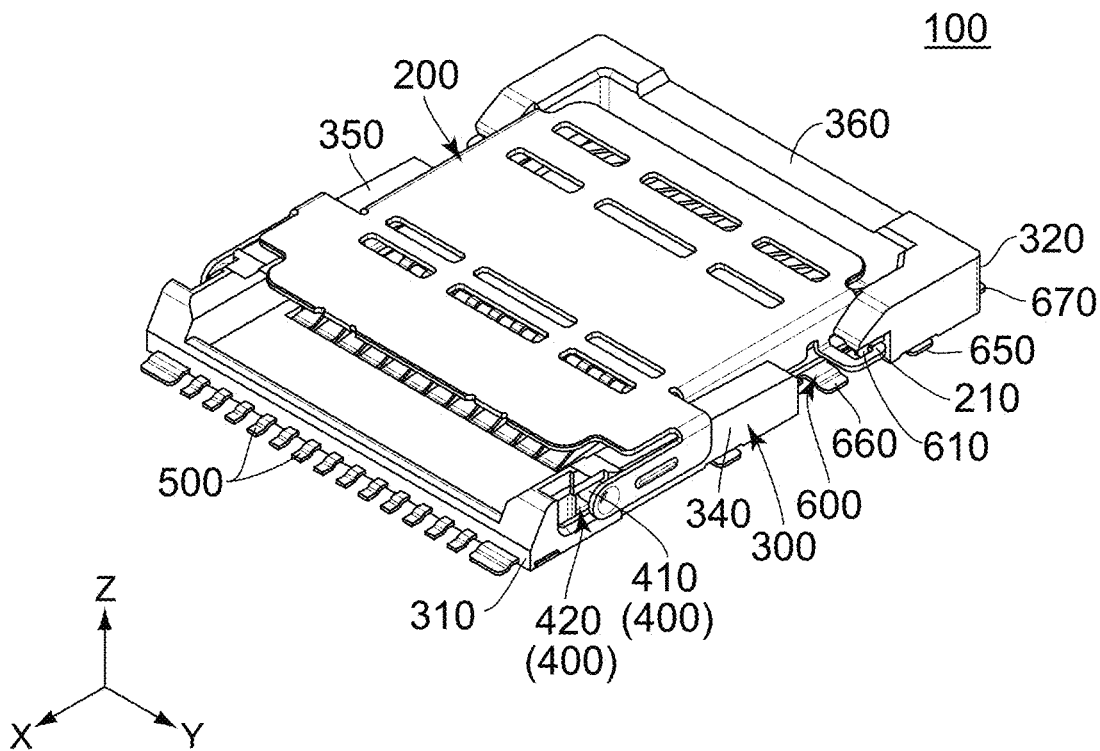
FIG. 1 is a perspective view showing a connector according to an embodiment of the present invention. In the figure, a cover is in a closed state.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 2:
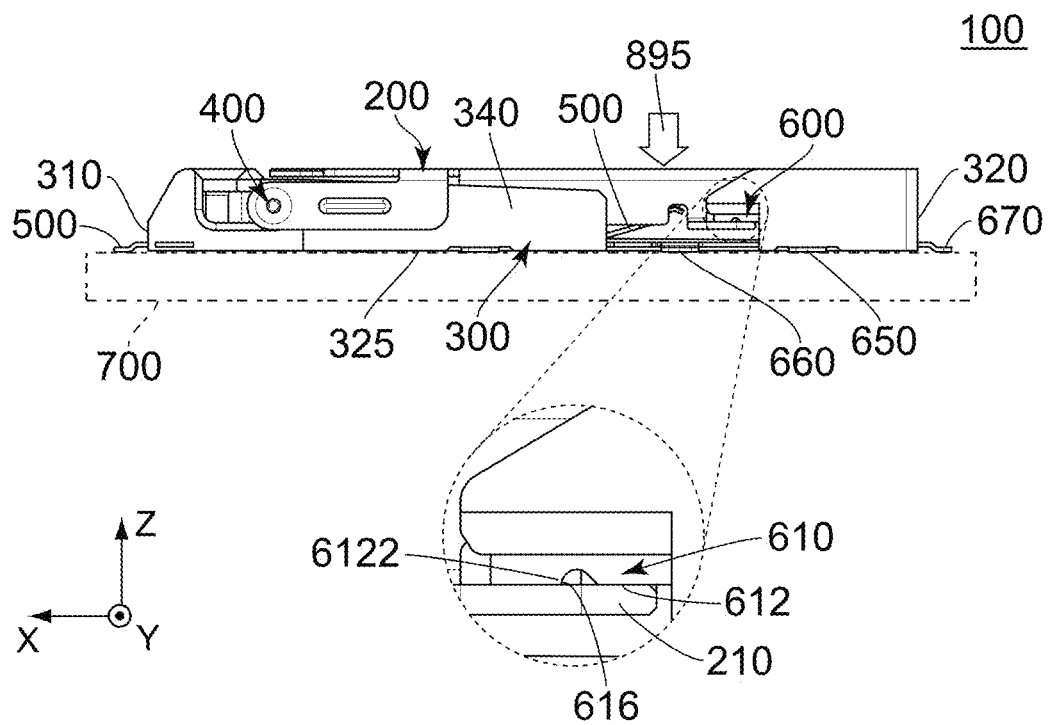
FIG. 2 is a side view showing the connector of FIG. 1. In the figure, a circuit board is illustrated by dotted line and a part of the connector is illustrated enlarged.
Figure 5:
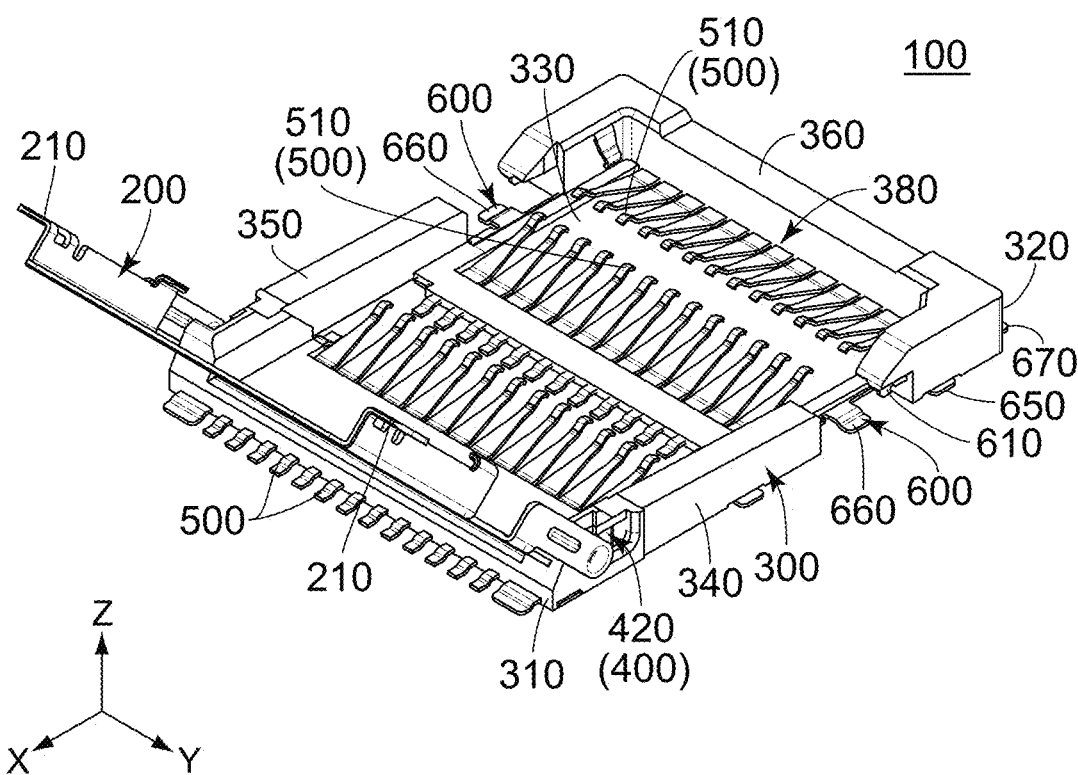
FIG. 5 is another perspective view showing the connector of FIG. 1. In the figure, the cover is in an opened state.
Figure 6:
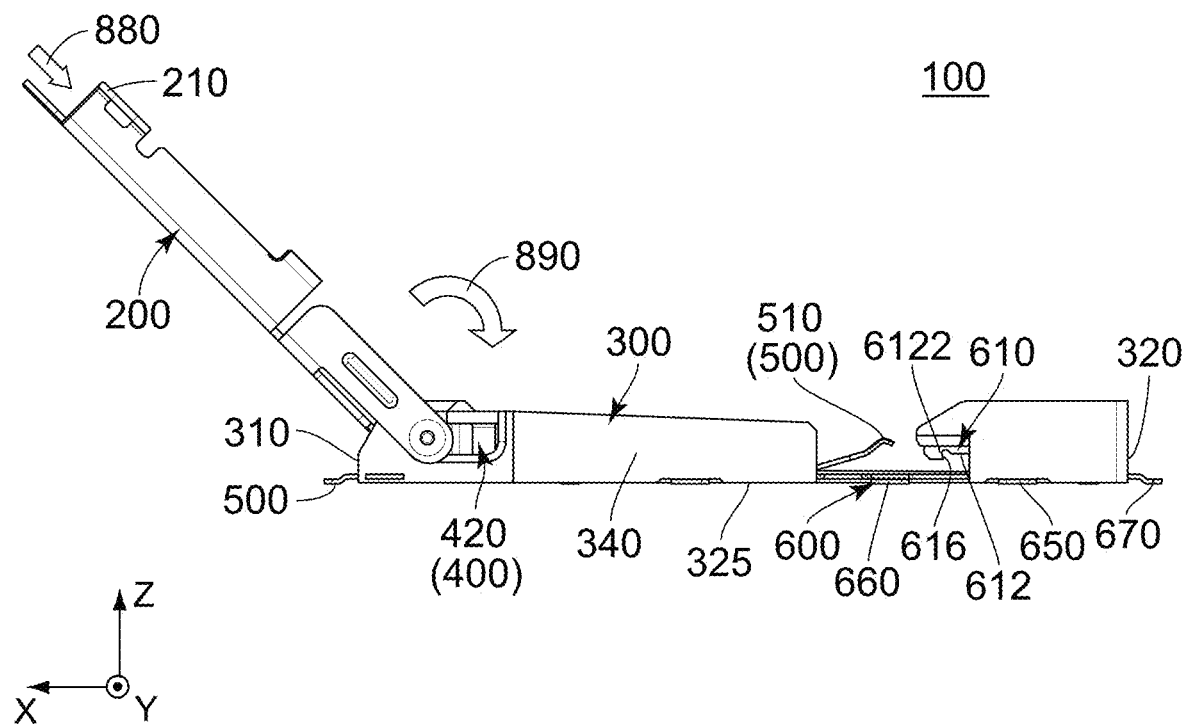
FIG. 6 is a side view showing the connector of FIG. 5.

Referring to FIGS. 5 and 6, a connector 100 according to an embodiment of the present invention is used for connection of a connecting object (not shown) such as a micro SD (Secure Digital) card. As shown in FIG. 2, the connector 100 of the present embodiment is mountable on a circuit board 700.

As shown in FIG. 5, the connector 100 comprises a cover 200, a base 300, hinge mechanisms 400, a plurality of terminals 500 and two metal members 600. However, the present invention is not limited thereto. The number of terminal 500 may be one, and the number of the metal member 600 may be one.

Referring to FIG. 1, the cover 200 of the present embodiment is made of metal. The cover 200 is attached to the base 300 by the hinge mechanisms 400. The cover 200 is provided with locked portions 210.

As shown in FIG. 5, the locked portions 210 of the present embodiment are positioned at opposite ends, respectively, of the cover 200 in a width direction. In the present embodiment, the width direction is a Y-direction.

Figure 7:
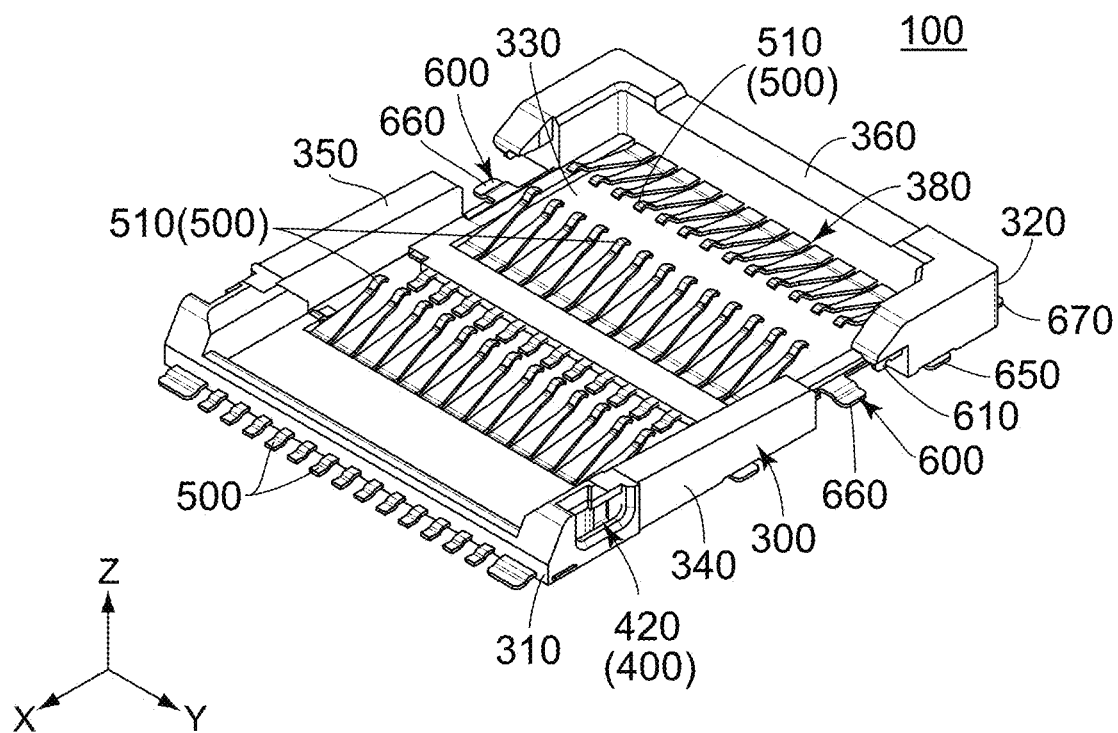
FIG. 7 is another perspective view showing the connector of FIG. 1. In the figure, the cover is omitted.

Referring to FIG. 7, the base 300 of the present embodiment is made of insulator. The base 300 has a front end 310 and a rear end 320 in a front-rear direction. The front end 310 is a frontmost end of the base 300. The rear end 320 is a rearmost end of the base 300. In the present embodiment, the front-rear direction is an X-direction. Specifically, it is assumed that forward is a positive X-direction while rearward is a negative X-direction.

As shown in FIG. 7, the base 300 has a bottom plate 330, two side walls 340, 350 and a rear wall 360.

Figure 8:
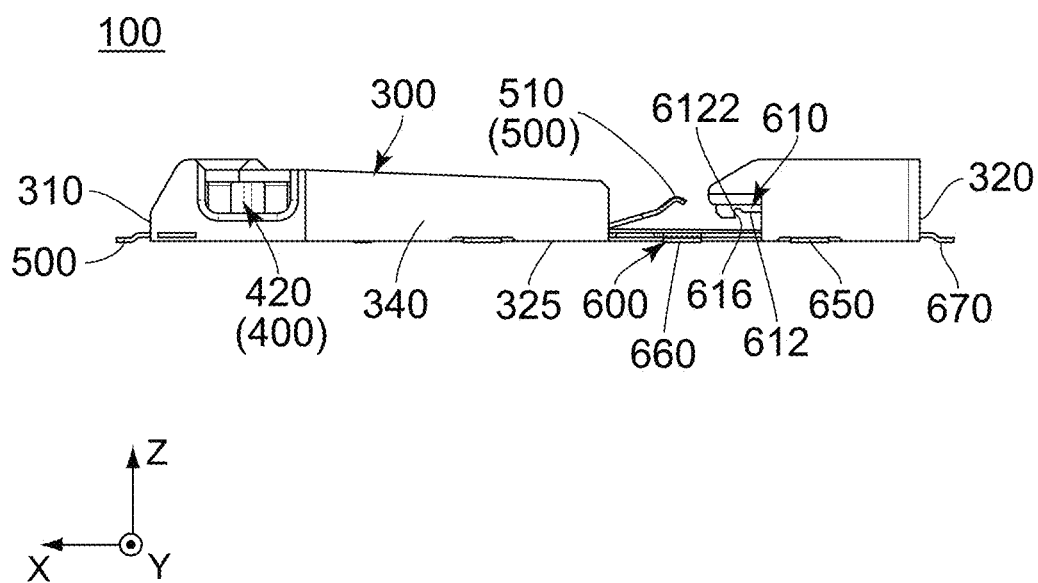
FIG. 8 is a side view showing the connector of FIG. 7.

As shown in FIG. 7, the bottom plate 330 of the present embodiment has a substantially flat-plate shape perpendicular to an up-down direction. As understood from FIGS. 7 and 8, the bottom plate 330 defines a lower end 325 of the base 300 in the up-down direction. In the present embodiment, the up-down direction is a Z-direction. Specifically, upward is a positive Z-direction while downward is a negative Z-direction.

Figure 3:
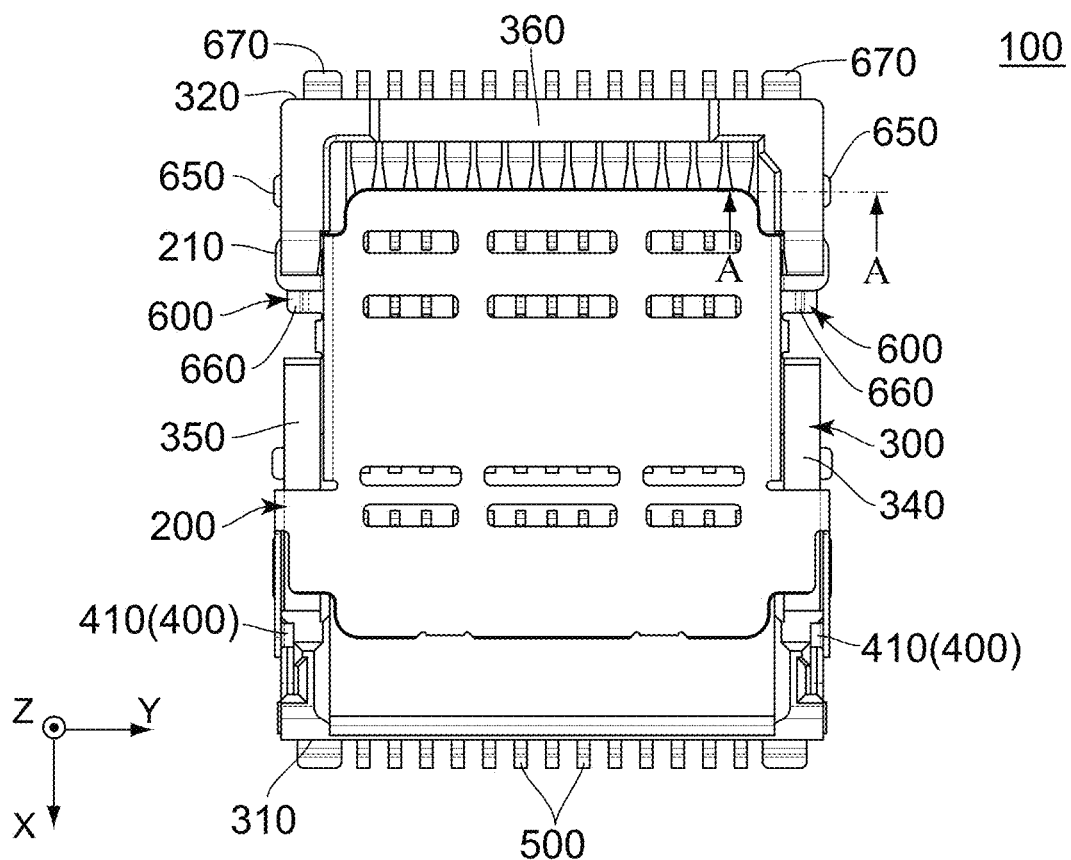
FIG. 3 is a top view showing the connector of FIG. 1.

As shown in FIG. 3, the side walls 340 and 350 of the present embodiment are positioned at opposite ends, respectively, of the base 300 in the width direction. As shown in FIG. 7, each of the side walls 340 and 350 extends upward in the up-down direction from the bottom plate 330.

As shown in FIG. 7, the rear wall 360 of the present embodiment is positioned at a rearmost end of the base 300 in the front-rear direction. The rear wall 360 extends upward in the up-down direction from the bottom plate 330.

As shown in FIG. 7, the bottom plate 330, the side walls 340 and 350, and the rear wall 360 of the base 300 form an accommodating portion 380. The accommodating portion 380 is a space which is configured to accommodate the connecting object.

As shown in FIG. 1, each of the hinge mechanisms 400 of the present embodiment is positioned closer to the front end 310 of the base 300 than to the rear end 320 of the base 300 in the front-rear direction. Each of the hinge mechanisms 400 consists of an axis 410 and a bearing 420

As shown in FIG. 3, the axis 410 of the present embodiment is provided on the cover 200. The axis 410 is a protrusion which has a cylindrical shape protruding inward in the width direction.

Referring to FIG. 7, the bearings 420 of the present embodiment are provided on the side walls 340 and 350, respectively, of the base 300. The bearing 420 is an elongated hole which is recessed inward in the width direction and which extends in the front-rear direction. As shown in FIG. 1, the axis 410 is received in the bearing 420. The axis 410 is movable in the front-rear direction within the bearing 420.

Referring to FIG. 7, each of the terminals 500 of the present embodiment is made of conductor. The terminals 500 are embedded in the bottom plate 330 of the base 300. Each of the terminals 500 has a contact portion 510 which is configured to be brought into contact with a pad (not shown) of the connecting object. The contact portion 510 is positioned in the accommodating portion 380.

Figure 9:
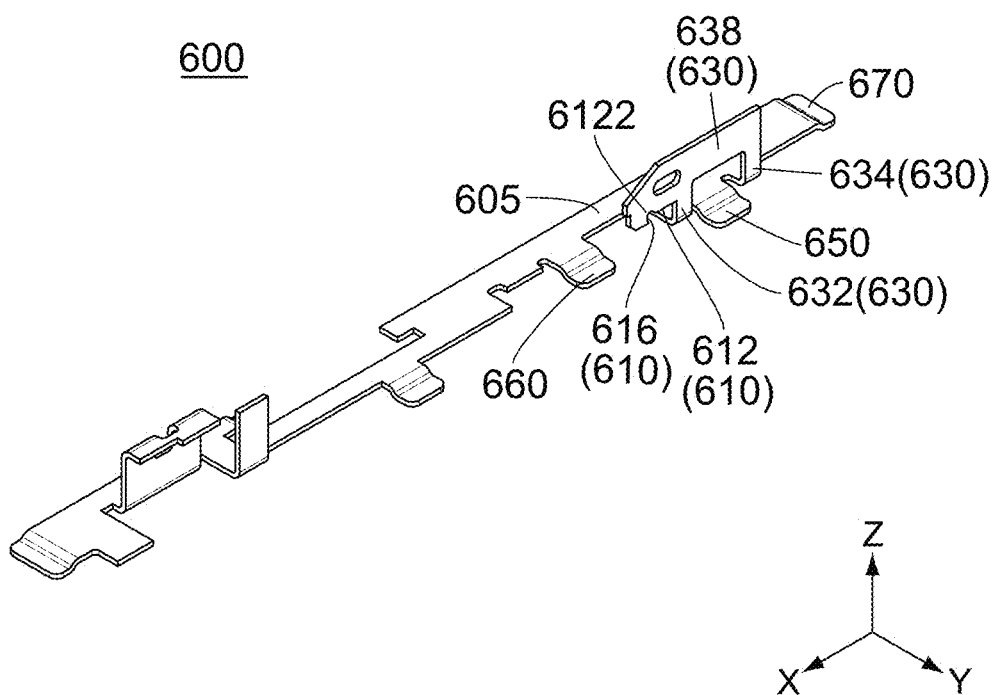
FIG. 9 is a perspective view showing a metal member, which is positioned at a positive Y-side of the connector, among metal members included in the connector of the FIG. 7.

As shown in FIG. 3, the metal members 600 of the present embodiment are held by the base 300. The two metal members 600 are positioned around the opposite ends, respectively, of the base 300 in the width direction. Referring to FIG. 9, each of the metal members 600 is made of metal. More specifically, the metal member 600 is formed by punching out a single metal plate, followed by bending it. The two metal members 600 have shapes which are mirror images of each other.

As shown in FIG. 9, each of the metal members 600 has a main portion 605, a locking portion 610, a coupling portion 630, a reinforcing portion 650, a soldered portion 660 and an additional soldered portion 670.

Figure 10:
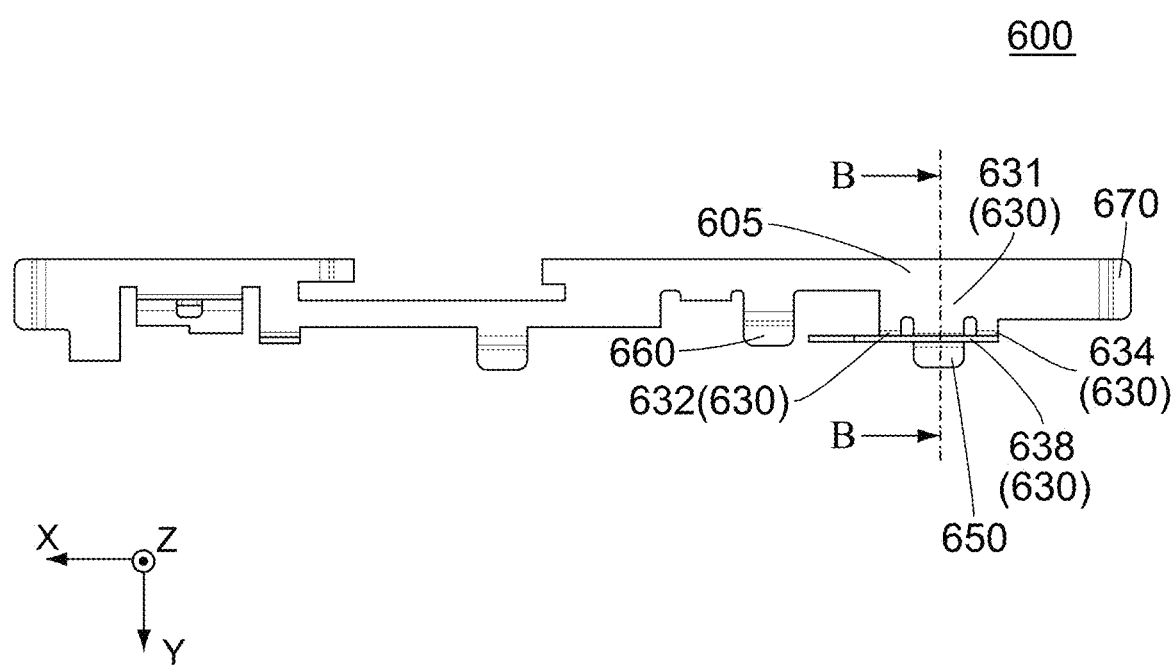
FIG. 10 is a top view showing the metal member of FIG. 9.
Figure 12:
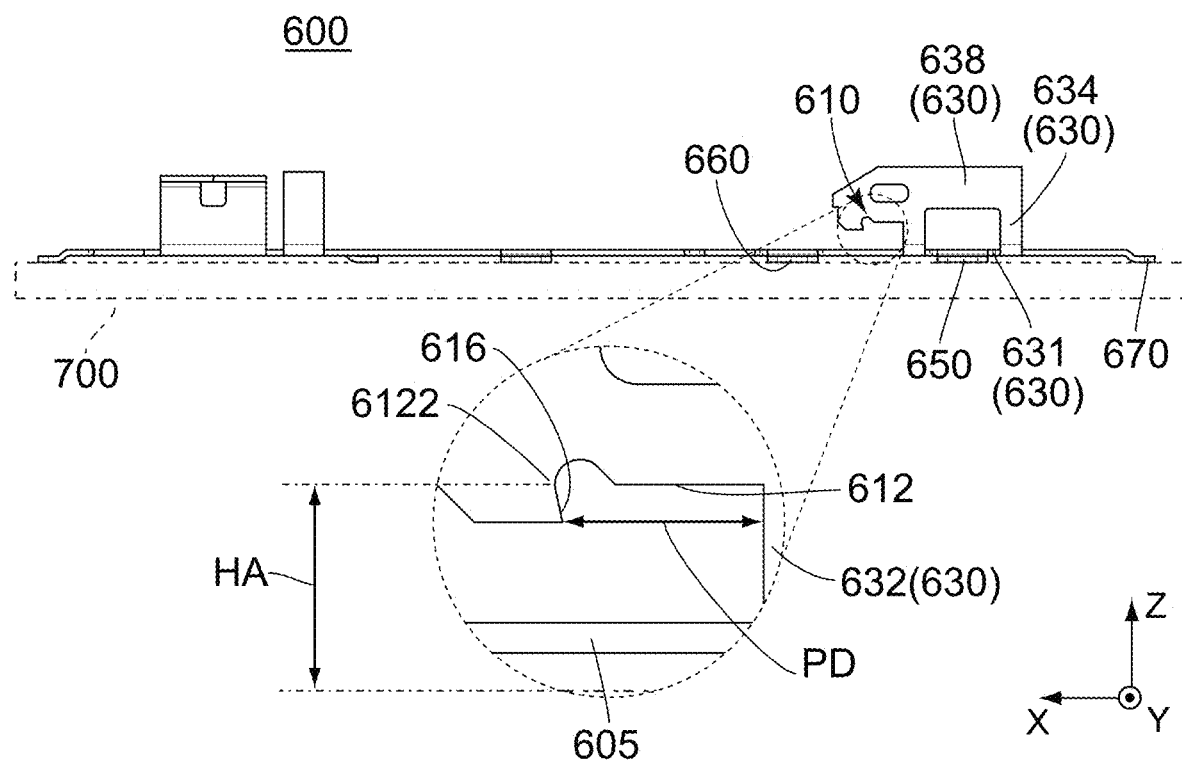
FIG. 12 is a side view showing the metal member of FIG. 9. In the figure, the circuit board is illustrated by dotted line, and a locking portion and its surroundings are illustrated enlarged.

As understood from FIGS. 10 and 12, the main portion 605 of the present embodiment has a flat-plate shape perpendicular to the up-down direction. The main portion 605 defines an inner end of the metal member 600 in the width direction.

As shown in FIG. 12, the locking portion 610 of the present embodiment has a first regulating portion 612 and a second regulating portion 616.

As shown in FIG. 12, the first regulating portion 612 of the present embodiment has a surface facing downward in the up-down direction. The first regulating portion 612 has a front end 6122 in the front-rear direction. The front end 6122 is a frontmost end of the first regulating portion 612.

As shown in FIG. 12, the second regulating portion 616 of the present embodiment is a surface intersecting with both the front-rear direction and the up-down direction. More specifically, the second regulating portion 616 is a surface facing upward and rearward. The second regulating portion 616 extends downward in the up-down direction perpendicular to the front-rear direction from the front end 6122 of the first regulating portion 612.

Figure 13:
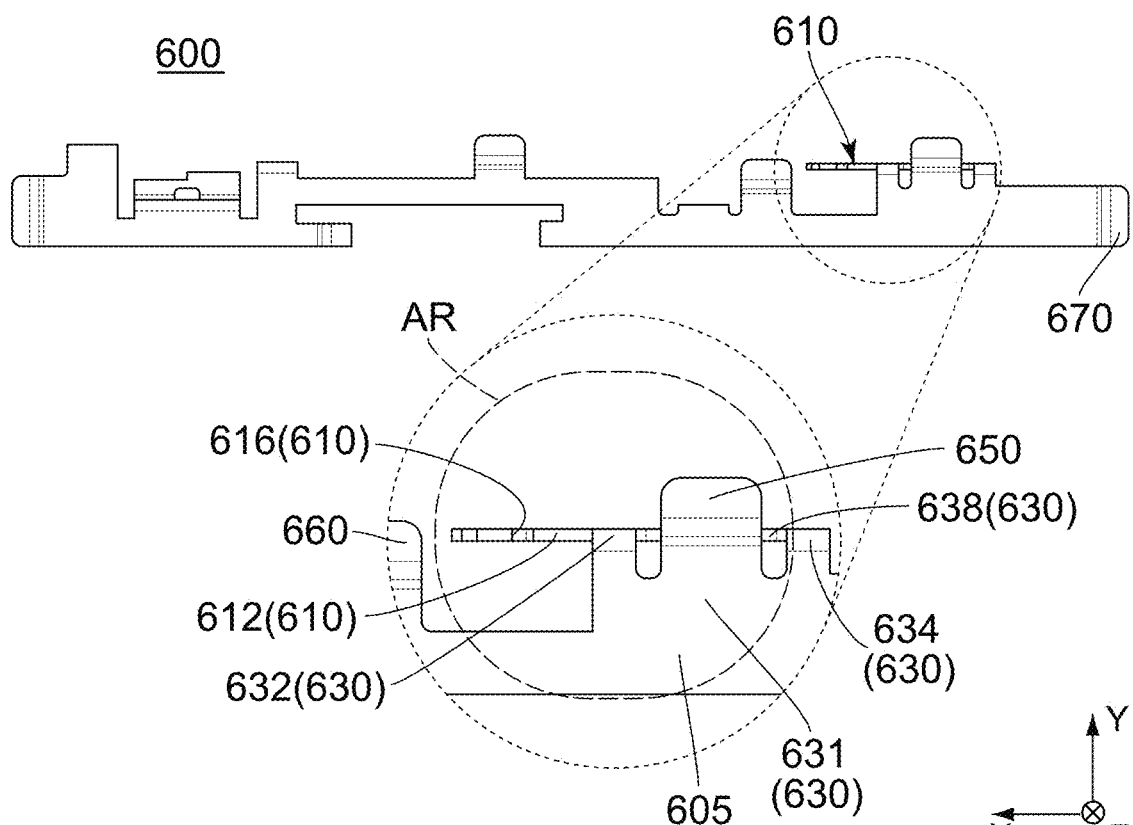
FIG. 13 is a bottom view showing the metal member of FIG. 9. In the figure, a part of the metal member is illustrated enlarged.

As shown in FIG. 12, the coupling portion 630 of the present embodiment is positioned rearward of the first regulating portion 612 in the front-rear direction. The coupling portion 630 integrally couples the first regulating portion 612 and the reinforcing portion 650 with each other. The coupling portion 630 and the second regulating portion 616 are positioned away from each other by a predetermined distance PD in the front-rear direction. As shown in FIG. 13, the coupling portion 630 is positioned outward of the main portion 605 in the width direction. The coupling portion 630 is connected with the main portion 605 in the width direction.

As shown in FIG. 12, the coupling portion 630 has a bottom portion 631, a standing portion 632, an additional standing portion 634 and a connecting portion 638.

As shown in FIG. 12, the bottom portion 631 of the present embodiment defines a lower end of the coupling portion 630. As shown in FIG. 13, the bottom portion 631 is positioned outward of the main portion 605 in the width direction. The bottom portion 631 is connected with the main portion 605 in the width direction. The bottom portion 631 couples the standing portion 632 and the reinforcing portion 650 with each other. The bottom portion 631 couples the additional standing portion 634 and the reinforcing portion 650 with each other. In other words, the bottom portion 631 couples the standing portion 632 and the additional standing portion 634 with each other.

As shown in FIGS. 12 and 13, the standing portion 632 of the present embodiment has a flat-plate shape extending in the up-down direction. The standing portion 632 extends downward in the up-down direction perpendicular to the front-rear direction from the first regulating portion 612. However, the present invention is not limited thereto. The standing portion 632 may be modified, provided that the standing portion 632 extends at least downward in the up-down direction perpendicular to the front-rear direction from the first regulating portion 612. The standing portion 632 and the second regulating portion 616 are positioned away from each other by the predetermined distance PD in the front-rear direction. More specifically, the standing portion 632 is positioned rearwardly away from the second regulating portion 616 by the predetermined distance PD in the front-rear direction. The standing portion 632 defines a front end of the coupling portion 630. The standing portion 632 extends upward in the up-down direction from the bottom portion 631. The standing portion 632 is positioned between the soldered portion 660 and the reinforcing portion 650 in the front-rear direction. More specifically, in the front-rear direction, the standing portion 632 is positioned rearward of the soldered portion 660 and forward of the reinforcing portion 650.

As shown in FIGS. 12 and 13, the additional standing portion 634 of the present embodiment has a flat-plate shape extending in the up-down direction. The additional standing portion 634 defines a rear end of the coupling portion 630. The additional standing portion 634 extends upward in the up-down direction from the bottom portion 631. The standing portion 632 and the additional standing portion 634 are positioned away from each other in the front-rear direction. More specifically, the additional standing portion 634 is positioned rearwardly away from the standing portion 632 in the front-rear direction. The additional standing portion 634 extends downward in the up-down direction from the connecting portion 638. The additional standing portion 634 is positioned between the reinforcing portion 650 and the additional soldered portion 670 in the front-rear direction. More specifically, in the front-rear direction, the additional standing portion 634 is positioned rearward of the reinforcing portion 650 and forward of the additional soldered portion 670.

Figure 11:
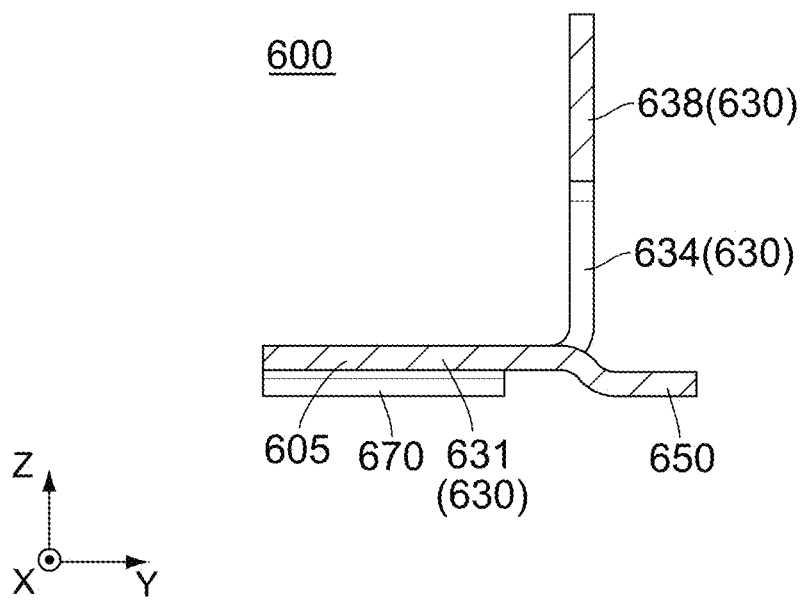
FIG. 11 is a cross-sectional view showing the metal member of FIG. 10, taken along line B-B.

As shown in FIGS. 11 and 12, the connecting portion 638 of the present embodiment has a flat-plate shape intersecting with the width direction. The connecting portion 638 defines an upper end of the coupling portion 630. The connecting portion 638 connects the standing portion 632 and the additional standing portion 634 with each other. The connecting portion 638 is positioned between the soldered portion 660 and the additional soldered portion 670 in the front-rear direction. More specifically, in the front-rear direction, the additional standing portion 634 is positioned rearward of the soldered portion 660 and forward of the additional soldered portion 670.

Figure 4:
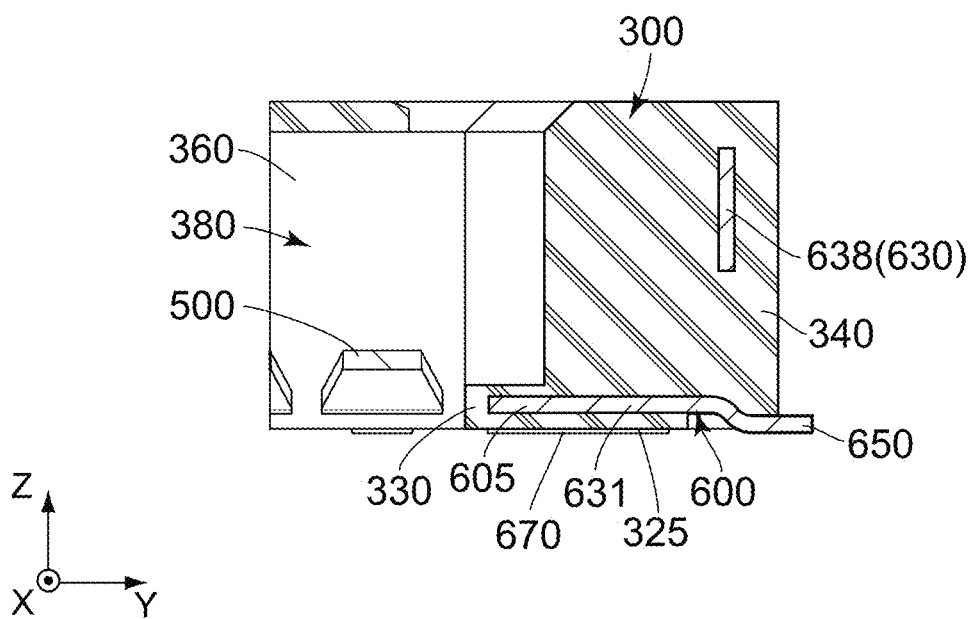
FIG. 4 is a cross-sectional view showing the connector of FIG. 3, taken along line A-A.

As shown in FIG. 2, the reinforcing portion 650 of the present embodiment is soldered on the circuit board 700 when the connector 100 is mounted on the circuit board 700. As shown in FIG. 4, a lower end of the reinforcing portion 650 is positioned below the lower end 325 of the base 300 in the up-down direction.

As shown in FIGS. 11 and 13, the reinforcing portion 650 has a flat-plate shape perpendicular to the up-down direction. The reinforcing portion 650 is positioned outward of the main portion 605 in the width direction. The reinforcing portion 650 extends outward in the width direction beyond the locking portion 610. The reinforcing portion 650 is positioned outward of the bottom portion 631 in the width direction. The reinforcing portion 650 extends outward in the width direction from the bottom portion 631. The reinforcing portion 650 extends in a direction intersecting with the standing portion 632. The reinforcing portion 650 extends outward in the width direction beyond the standing portion 632. The reinforcing portion 650 extends in the direction intersecting with the additional standing portion 634. The reinforcing portion 650 extends outward in the width direction beyond the additional standing portion 634. The reinforcing portion 650 is positioned between the standing portion 632 and the additional standing portion 634 in the front-rear direction. More specifically, in the front-rear direction, the reinforcing portion 650 is positioned rearward of the standing portion 632 and forward of the additional standing portion 634. The reinforcing portion 650 extends in the direction intersecting with the connecting portion 638. The reinforcing portion 650 extends outward in the width direction beyond the connecting portion 638. The reinforcing portion 650 extends outward in the width direction beyond the soldered portion 660. The reinforcing portion 650 is positioned between the standing portion 632 and the additional soldered portion 670 in the front-rear direction.

As shown in FIG. 13, in a plane perpendicular to the up-down direction, the reinforcing portion 650 is fully included in an area AR within a range of twice the predetermined distance PD (see FIG. 12) from the standing portion 632. However, the present invention is not limited thereto. The reinforcing portion 650 may be modified, provided that, in the plane perpendicular to the up-down direction, the reinforcing portion 650 at least overlaps with the area AR within the range of twice the predetermined distance PD from the standing portion 632. This enables the reinforcing portion 650 to be positioned at a place which is just below the locking portion 610 or in the vicinity below the locking portion 610.

As shown in FIG. 2, the soldered portion 660 of the present embodiment is soldered on the circuit board 700 when the connector 100 is mounted on the circuit board 700. A lower end of the soldered portion 660 is positioned below the lower end 325 of the base 300 in the up-down direction.

As shown in FIGS. 12 and 13, the soldered portion 660 has a flat-plate shape perpendicular to the up-down direction. The soldered portion 660 is positioned outward of the main portion 605 in the width direction. The soldered portion 660 is connected with the main portion 605 in the width direction. The soldered portion 660 extends outward in the width direction from the main portion 605. The soldered portion 660 is positioned forward of the locking portion 610 in the front-rear direction. The soldered portion 660 is positioned forward of the coupling portion 630 in the front-rear direction. The soldered portion 660 extends in a direction intersecting with the standing portion 632. The soldered portion 660 extends in the direction intersecting with the additional standing portion 634. The soldered portion 660 extends in the direction intersecting with the connecting portion 638. The soldered portion 660 is positioned forward of the reinforcing portion 650 in the front-rear direction. In the plane perpendicular to the up-down direction, the soldered portion 660 does not overlap with the area AR within the range of twice the predetermined distance PD from the standing portion 632. Put differently, in the plane perpendicular to the up-down direction, an outer periphery of the soldered portion 660 is positioned outside the area AR within the range of twice the predetermined distance PD from the standing portion 632.

As shown in FIG. 2, the additional soldered portion 670 of the present embodiment is soldered on the circuit board 700 when the connector 100 is mounted on the circuit board 700. A lower end of the additional soldered portion 670 is positioned below the lower end 325 of the base 300 in the up-down direction.

As shown in FIGS. 12 and 13, the additional soldered portion 670 has a flat-plate shape perpendicular to the up-down direction. The additional soldered portion 670 is positioned rearward of the main portion 605 in the front-rear direction. The additional soldered portion 670 is positioned rearward of the coupling portion 630 in the front-rear direction. The additional soldered portion 670 is connected with the main portion 605 in the front-rear direction. The additional soldered portion 670 extends rearward in the front-rear direction from the main portion 605. The additional soldered portion 670 is positioned rearward of the locking portion 610 in the front-rear direction. The additional soldered portion 670 extends in a direction intersecting with the standing portion 632. The additional soldered portion 670 extends in the direction intersecting with the additional standing portion 634. The additional soldered portion 670 extends in the direction intersecting with the connecting portion 638. The additional soldered portion 670 is positioned rearward of the reinforcing portion 650 in the front-rear direction.

Referring to FIGS. 1, 2, 5, 6 and 12, hereinafter, description will be made about an operation of connecting the connector 100 with the connecting object (not shown).

First, Referring to FIG. 6, the connecting object is slid into the cover 200 in a direction of arrow 880 to be held by the cover 200. Then, the cover 200 is rotated in a direction of arrow 890 to be overlaid over the base 300. Meanwhile, the axis 410 (see FIG. 1) of the cover 200 is positioned at a front end of the bearing 420 of the base 300.

After the overlay of the cover 200 over the base 300, the cover 200 is slid rearward while a downward force is applied to the cover 200 so that the cover 200 is pushed downward. Then, the pad (not shown) of the connecting object is brought into pressure contact with the contact portion 510 of the terminal 500 while the locked portion 210 is inserted into a space which is below the locking portion 610. When the application of the downward force is terminated under this state, the cover 200 is moved upward by a reaction force of springs of the terminals 500 so that the cover 200 reaches a closed state shown in FIG. 2.

Meanwhile, the first regulating portion 612 of the locking portion 610 is brought into contact with the locked portion 210 from above. Specifically, the reaction force of the springs of the terminals 500 presses the locked portion 210 against the first regulating portion 612 via the connecting object so that a force is applied to the first regulating portion 612. Also meanwhile, the second regulating portion 616 of the locking portion 610 is positioned forward of the locked portion 210 in the front-rear direction. In other words, when the cover 200 is in the closed state, an upward movement of the locked portion 210 relative to the base 300 is regulated while a forward movement of the locked portion 210 relative the base 300 is regulated.

Again, the metal member 600 of the connector 100 of the present embodiment is configured as follows: the metal member 600 has the reinforcing portion 650 which is soldered on the circuit board 700 when the connector 100 is mounted on the circuit board 700; and the reinforcing portion 650 is configured to be soldered on the circuit board 700 at the place which is just below the locking portion 610 or in the vicinity below the locking portion 610. Accordingly, even if the cover 200 is in the closed state, the force, which is applied to the first regulating portion 612 by the reaction force of the springs of the terminals 500, is securely received by the circuit board 700 via the coupling portion 630 and the reinforcing portion 650. Thus, the base 300, which supports the metal members 600, can be prevented from being damaged and deformed. In particular, this effect of the reinforcing portion 650 is noticeable in a case where the connector 100 has an increased number of the terminals 500 so that a total reaction force of the springs of the terminals 500 is increased.

Referring to FIGS. 1, 2, 5, 6 and 12, hereinafter, description will be made in detail about operations of opening the cover 200 and ejecting the connecting object from the connector 100.

First, a force in a direction of arrow 895 of FIG. 2 is applied to the cover 200 so that cover 200 is pushed downward. Then, the cover 200 is moved downward to some extent while pressing the terminals 500 downward via the connecting object. Meanwhile, in the up-down direction, the locked portion 210 is positioned downwardly away from the first regulating portion 612 and lower than the second regulating portion 616.

Next, the cover 200 is slid forward while the cover 200 is pushed downward. Then, the locked portion 210 is moved forward beyond the locking portion 610 and thereby the cover 200 reaches a lock released state.

Meanwhile, the second regulating portion 616 of the locking portion 610 is positioned rearward beyond the locked portion 210. In other words, an upward movement of the locked portion 210 relative to the base 300 is not regulated when the cover 200 is in the lock released state.

When the application of the force to the cover 200 is terminated under the lock released state, a rear end of the cover 200 is pushed upward to some extent by the reaction force of the springs of the terminals 500. After that, the cover 200 is rotated in a direction which is opposite to the direction of arrow 890 (see FIG. 6). Then, the cover 200 reaches an opened state shown in each of FIGS. 5 and 6. Under this opened state, the connecting object is removable from the connector 100 in the reverse of the aforementioned manner of holding the connecting object to the cover 200.

Hereinafter, description will be made in detail about a deformation of the metal member 600 of the present embodiment upon application of an upward force F to the first regulating portion 612 of the metal member 600 as compared with a deformation of a metal member 800 of Comparative Example upon application of the upward force F to a first regulating portion 812. This upward force F is assumed to be the reaction force of the springs of the terminals 500 when the cover 200 holding the connecting object is in the closed state.

Figure 16:
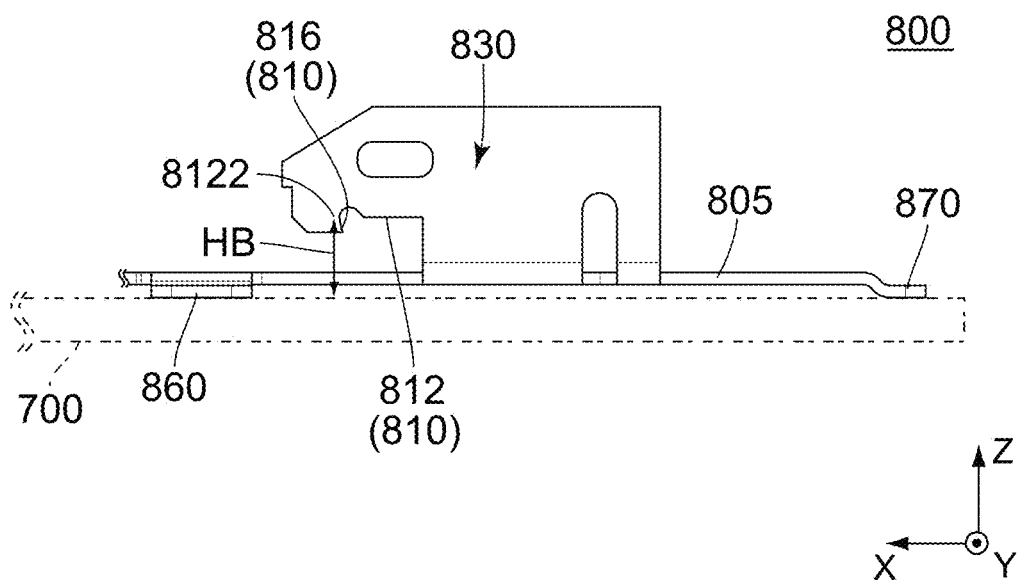
FIG. 16 is a side view showing a metal member, which is provided with no reinforcing portion, as Comparative Example. In the figure, only a part of the metal member of Comparative Example is illustrated and a part of a circuit board is illustrated by dotted line.

Referring to FIGS. 12 and 16, the metal member 800 of Comparative Example has a structure similar to that of the metal member 600 except that the metal member 800 has no reinforcing portion 650. The metal member 800 is formed by punching out a single metal plate, followed by bending it. Specifically, the metal member 800 has a main portion 805, a locking portion 810, a coupling portion 830, a soldered portion 860 and an additional soldered portion 870. The locking portion 810 has a first regulating portion 812 and a second regulating portion 816. The first regulating portion 812 has a front end 8122 in the front-rear direction. The second regulating portion 816 extends downward in the up-down direction perpendicular to the front-rear direction from the front end 8122 of the first regulating portion 812. The main portion 805, the locking portion 810, the soldered portion 860 and the additional soldered portion 870 of Comparative Example have structures same as those of the main portion 605, the locking portion 610, the soldered portion 660 and the additional soldered portion 670, respectively, of the present embodiment. The first regulating portion 812, the front end 8122 and the second regulating portion 816 of Comparative Example has structures same as those of the first regulating portion 612, the front end 6122 and the second regulating portion 616, respectively, of the present embodiment. The coupling portion 830 of Comparative Example has a structure similar to that of the coupling portion 630 of the present embodiment except that the coupling portion 830 has no reinforcing portion 650.

Figure 14:
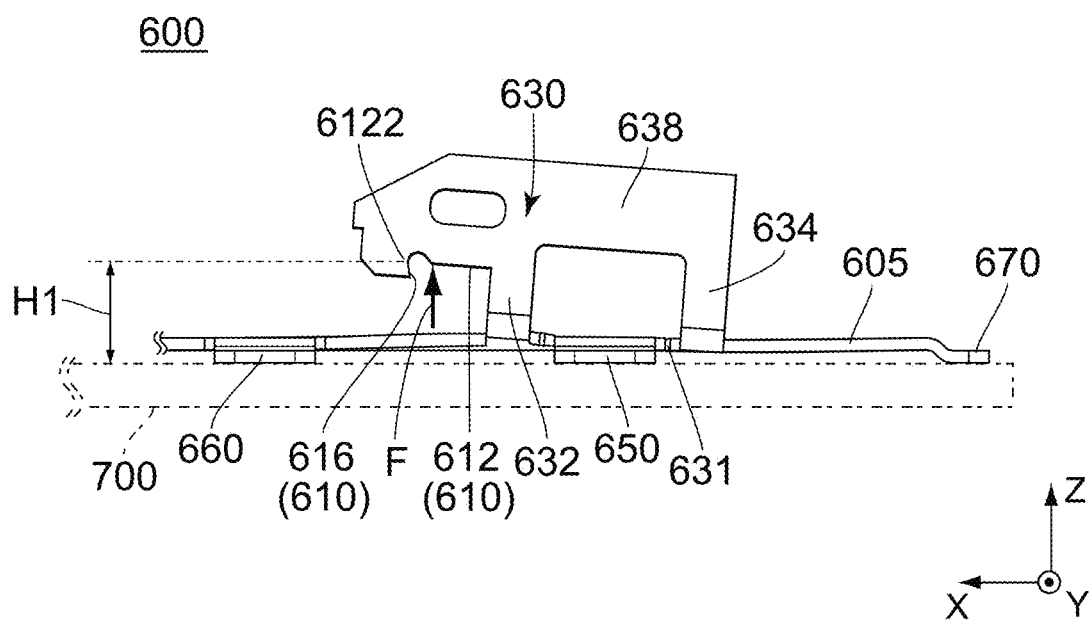
FIG. 14 is a side view showing a state where an upward force is applied to a first regulating portion of the metal member of FIG. 12. In the figure, only a part of the metal member is illustrated and a part of the circuit board is illustrated by dotted line.
Figure 15:
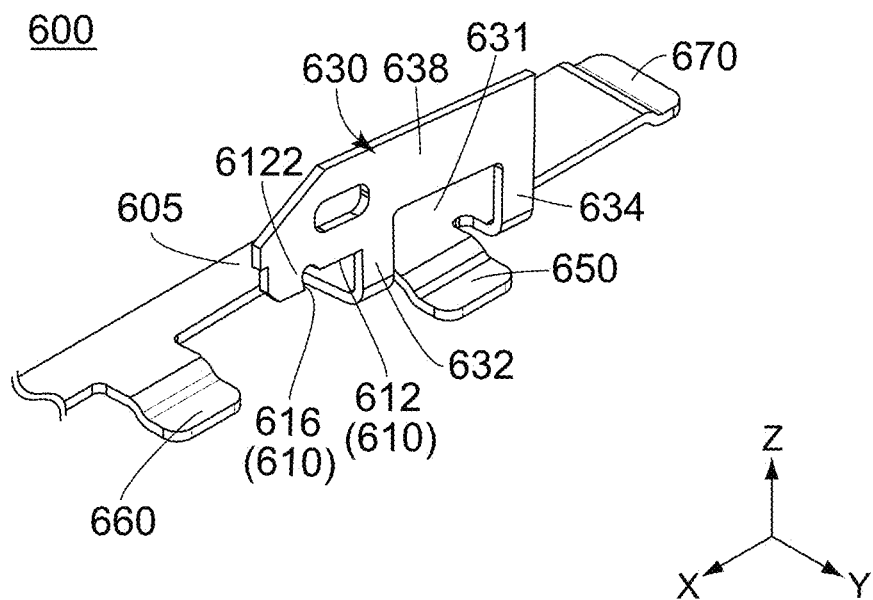
FIG. 15 is a perspective view showing the state of FIG. 14.
Figure 17:
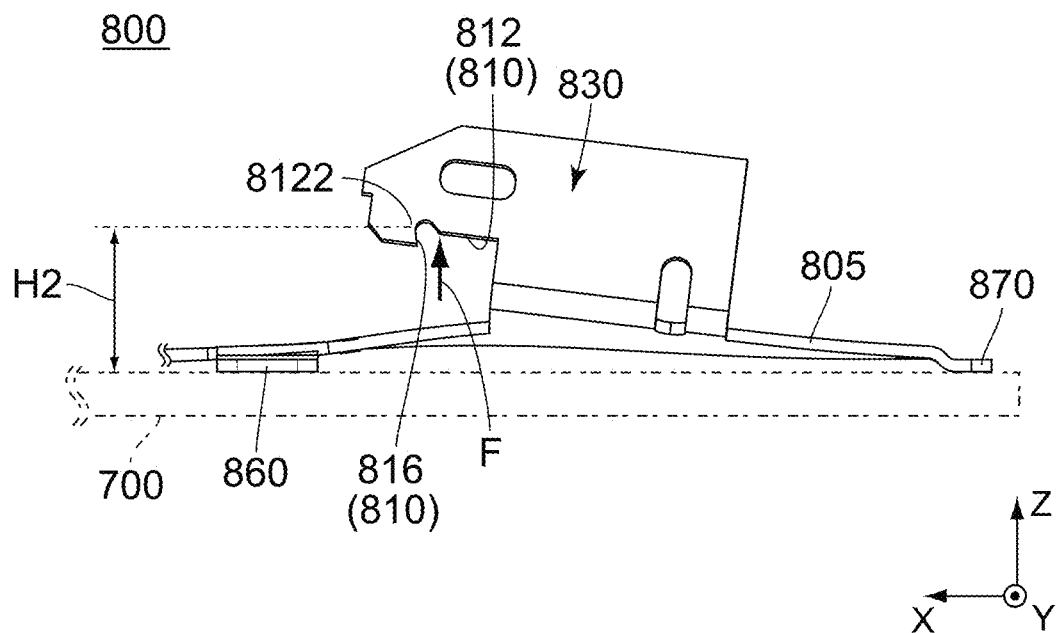
FIG. 17 is a side view showing a state where an upward force is applied to a first regulating portion of the metal member of FIG. 16. In the figure, a part of the circuit board is illustrated by dotted line.
Figure 18:
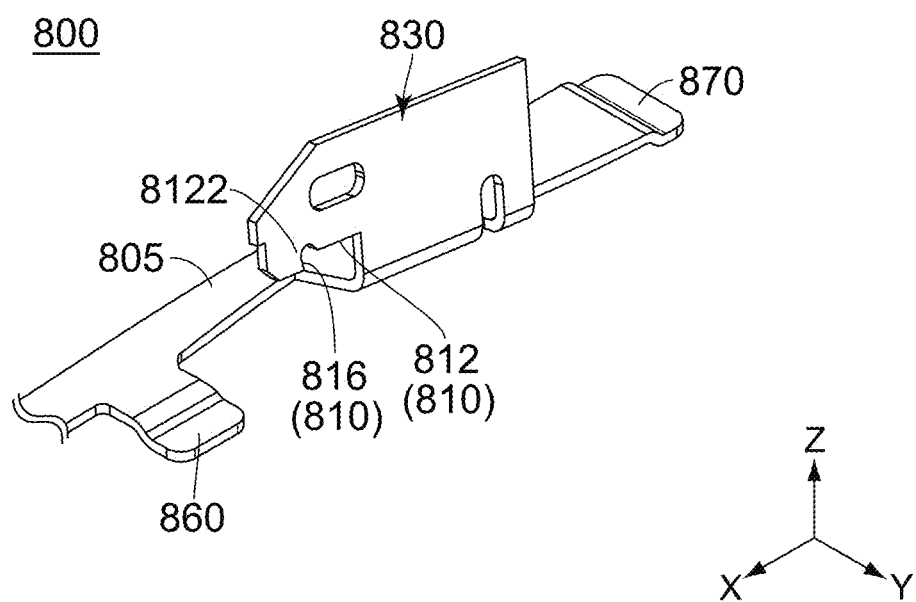
FIG. 18 is a perspective view showing the state of FIG. 17.
Figure 19:
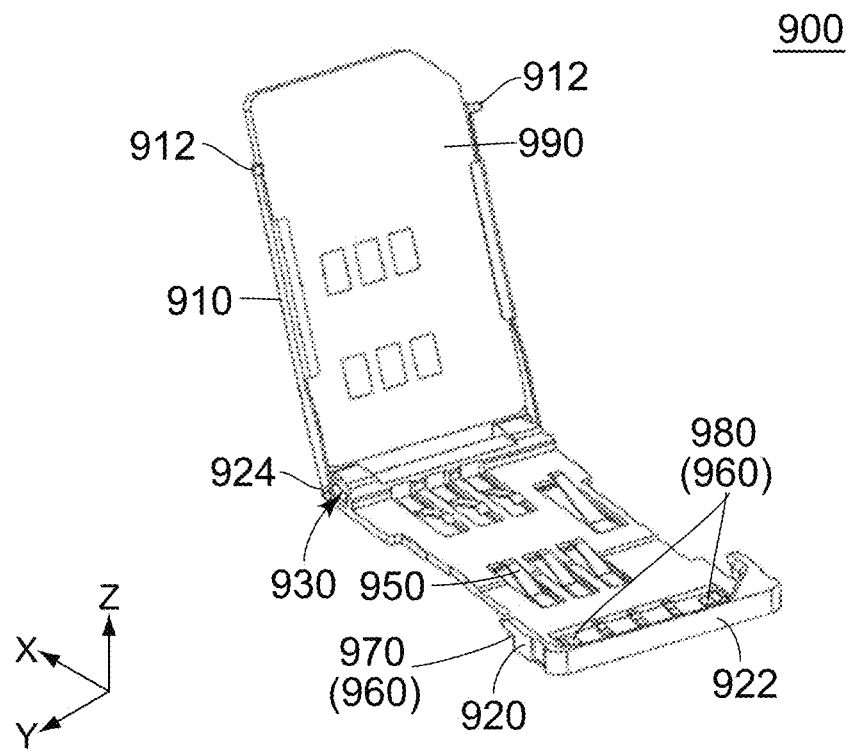
FIG. 19 is a perspective view showing a connector of Patent Document 1. In the figure, a cover is in an opened state.
Figure 20:
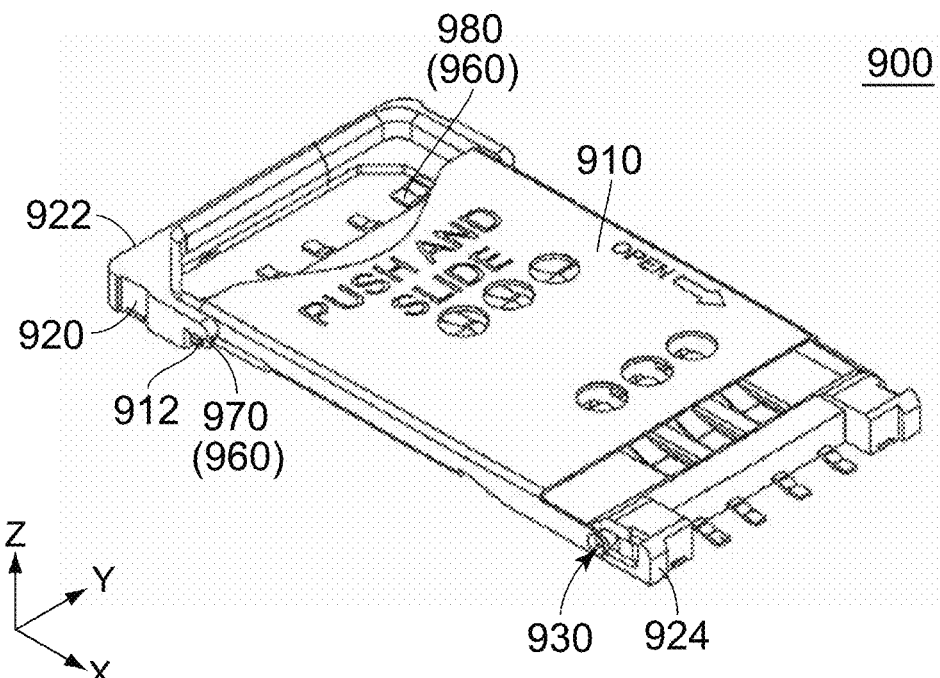
FIG. 20 is a perspective view showing the connector of FIG. 19. In the figure, a card is omitted and the cover is in a closed state.
Figure 21:
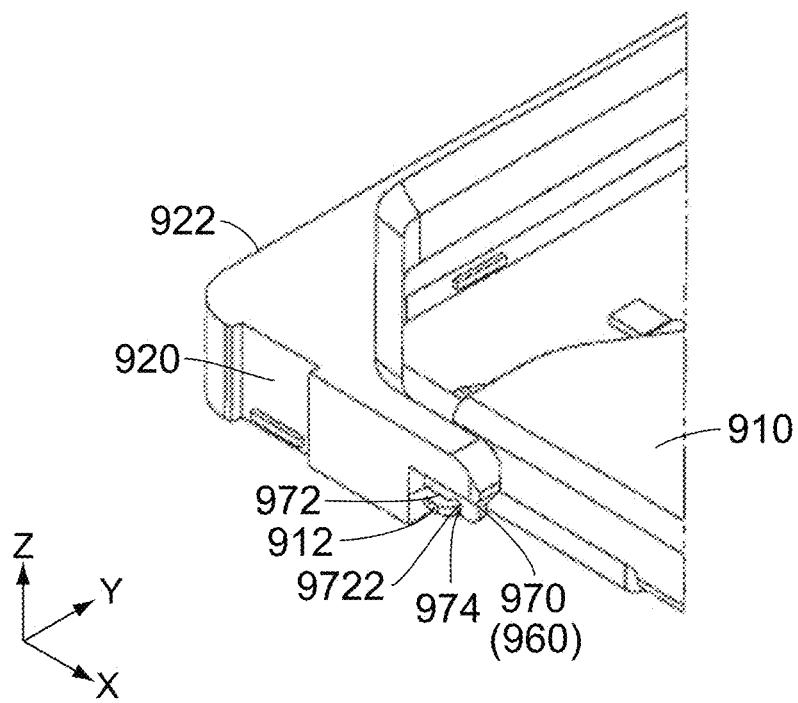
FIG. 21 is an enlarged, perspective view showing a part of the connector of FIG. 20.

Each of FIGS. 14 and 15 shows a state where the metal member 600 is deformed when the upward force F is applied to the first regulating portion 612 of the metal member 600 of the present embodiment. Each of FIGS. 17 and 18 shows a state where the metal member 800 is deformed when the upward force F is applied to the first regulating portion 812 of the metal member 800 of Comparative Example.

Referring to FIGS. 12 and 14, an amount D1 of movement of the front end 6122, which is caused by the force F, of the metal member 600 of the present embodiment is defined by an expression of D1=H1−HA, where H1 represents a distance between the front end 6122 of the first regulating portion 612 of the metal member 600 and the circuit board 700 when the force F is applied to the first regulating portion 612, and HA represents a distance between the front end 6122 of the first regulating portion 612 of the metal member 600 and the circuit board 700 when no load is applied to the metal member 600. Referring to FIGS. 16 and 17, an amount D2 of movement of the front end 8122, which is caused by the force F, of the metal member 800 of Comparative Example is defined by an expression of D2=H2−HB, where H2 represents a distance between the front end 8122 of the first regulating portion 812 of the metal member 800 and the circuit board 700 when the force F is applied to the first regulating portion 812, and HB represents a distance between the front end 8122 of the first regulating portion 812 of the metal member 800 and the circuit board 700 when no load is applied to the metal member 800. Since the metal member 800 of Comparative Example has the structure similar to that of the metal member 600 of present embodiment as described above, HA is equal to HB. Referring to FIGS. 14 and 17, the amount D1 of movement of the front end 6122 of the present embodiment is smaller than the amount D2 of movement of the front end 8122 of Comparative Example. More specifically, the amount D1 of movement of the front end 6122 of the present embodiment is equal to or smaller than a half of the amount D2 of the movement of the front end 8122 of Comparative Example. Accordingly, the force, which is applied to the first regulating portion 612 of the metal member 600 of the present embodiment by the reaction force of the springs of the terminals 500, can be more securely received by the circuit board 700 in comparison with the metal member 800 of Comparative Example having no reinforcing portion 650. Thus, the base 300, which supports the metal members 600, can be effectually prevented from being damaged and deformed.

Although the specific explanation about the present invention is made above referring to the embodiments, the present invention is not limited thereto and is susceptible to various modifications and alternative forms.

Although the reinforcing portion 650 of the present embodiment is positioned rearward of the standing portion 632 in the front-rear direction, the present invention is not limited thereto. Specifically, provided that the reinforcing portion 650 at least overlaps with the area AR in the plane perpendicular to the up-down direction, the reinforcing portion 650 may be positioned forward of the standing portion 632 in the front-rear direction or may be positioned at a position same as that of the standing portion 632 in the front-rear direction.

Although the reinforcing portion 650 of the present embodiment extends outward in the width direction beyond the bottom portion 631, the present invention is not limited thereto. Specifically, provided that the reinforcing portion 650 at least overlaps with the area AR in the plane perpendicular to the up-down direction, the reinforcing portion 650 may extend inward in the width direction from the bottom portion 631 or may extend in the front-rear direction from the bottom portion 631.

Although the coupling portion 630 of the present embodiment has the bottom portion 631, the standing portion 632, the additional standing portion 634 and the connecting portion 638, the present invention is not limited thereto. The coupling portion 630 may be modified, provided that the coupling portion 630 has the standing portion 632. In other words, the coupling portion 630 may have none of the bottom portion 631, the additional standing portion 634 and the connecting portion 638. If the coupling portion 630 consists of only the standing portion 632, the reinforcing portion 650 should extend directly from the standing portion 632. If the coupling portion 630 consists of only a set of the bottom portion 631 and the standing portion 632, the reinforcing portion 650 should extend from the bottom portion 631 as long as the reinforcing portion 650 at least overlaps with the area AR in the plane perpendicular to the up-down direction.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector mountable on a circuit board, wherein:
the connector comprises a cover, a base, a hinge mechanism, a terminal and a metal member;
the cover is attached to the base by the hinge mechanism;
the base has a front end and a rear end in a front-rear direction;
the hinge mechanism is closer to the front end of the base than to the rear end of the base in the front-rear direction;
the cover is provided with a locked portion;
the metal member is held by the base;
the metal member has a locking portion, a coupling portion and a reinforcing portion;
the locking portion has a first regulating portion and a second regulating portion;
the first regulating portion has a front end in the front-rear direction;
the second regulating portion extends downward in an up-down direction perpendicular to the front-rear direction from the front end of the first regulating portion;
the coupling portion integrally couples the first regulating portion and the reinforcing portion with each other;
the coupling portion and the second regulating portion are positioned away from each other by a predetermined distance in the front-rear direction;
the coupling portion has a standing portion;
the standing portion extends at least downward in the up-down direction from the first regulating portion;
the reinforcing portion is soldered on the circuit board when the connector is mounted on the circuit board;
in a plane perpendicular to the up-down direction, the reinforcing portion at least overlaps with an area within a range of twice the predetermined distance from the standing portion; and
the locked portion is configured to be pressed against the first regulating portion from below in the up-down direction.

2. The connector recited in claim 1, wherein:
the coupling portion further has an additional standing portion;
the standing portion and the additional standing portion are positioned away from each other in the front-rear direction; and
the reinforcing portion is positioned between the standing portion and the additional standing portion in the front-rear direction.

3. The connector recited in claim 1, wherein the reinforcing portion extends in a direction intersecting with the standing portion.

4. The connector recited in claim 1, wherein:
the metal member further has a soldered portion;
the soldered portion is soldered on the circuit board when the connector is mounted on the circuit board; and
the standing portion is positioned between the soldered portion and the reinforcing portion in the front-rear direction.

5. The connector recited in claim 4, wherein:
the metal member further has an additional soldered portion;
the additional soldered portion is soldered on the circuit board when the connector is mounted on the circuit board; and
the reinforcing portion is positioned between the standing portion and the additional soldered portion in the front-rear direction.

* * * * *